US008169434B2

(12) United States Patent
Zhou et al.

(10) Patent No.: US 8,169,434 B2
(45) Date of Patent: May 1, 2012

(54) OCTREE CONSTRUCTION ON GRAPHICS PROCESSING UNITS

(75) Inventors: Kun Zhou, Beijing (CN); Minmin Gong, Beijing (CN); Baining Guo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 713 days.

(21) Appl. No.: 12/240,973

(22) Filed: Sep. 29, 2008

(65) Prior Publication Data
US 2010/0082703 A1   Apr. 1, 2010

(51) Int. Cl.
*G06T 15/00* (2011.01)
*G06T 15/04* (2011.01)
*G06T 15/08* (2011.01)

(52) U.S. Cl. ........ 345/419; 345/420; 345/421; 345/582; 345/583; 712/10; 712/11; 712/12; 712/13

(58) Field of Classification Search .......... 345/501–506, 345/419–421, 582, 583; 712/10–16
See application file for complete search history.

(56) References Cited

U.S. PATENT DOCUMENTS

| | | | | |
|---|---|---|---|---|
| 5,454,068 A | * | 9/1995 | Ramanujam | 345/419 |
| 6,029,170 A | * | 2/2000 | Garger et al. | 1/1 |
| 6,292,194 B1 | * | 9/2001 | Powell, III | 345/582 |
| 6,429,864 B1 | * | 8/2002 | Schwarzer | 345/419 |
| 6,445,390 B1 | * | 9/2002 | Aftosmis et al. | 345/421 |
| 6,735,334 B2 | * | 5/2004 | Roberts | 382/167 |
| 6,954,789 B2 | * | 10/2005 | Dietz et al. | 709/224 |
| 7,002,571 B2 | | 2/2006 | Lake et al. | |
| 7,111,253 B2 | * | 9/2006 | Newman | 715/854 |
| 7,242,401 B2 | | 7/2007 | Yang et al. | |
| 7,301,538 B2 | | 11/2007 | Buyanovskiy | |
| 2006/0248048 A1 | * | 11/2006 | Jain et al. | 707/2 |
| 2008/0024515 A1 | | 1/2008 | Yang et al. | |

(Continued)

FOREIGN PATENT DOCUMENTS
EP        0152741 A2    8/1985

OTHER PUBLICATIONS

Zhou, K., M. Gong, X. Huang, and B. Guo, Highly parallel surface reconstruction, Microsoft Research, TechReport MSR-TR-2008-53, Apr. 2008, pp. 1-10.

(Continued)

*Primary Examiner* — Xiao M. Wu
*Assistant Examiner* — Todd Buttram
(74) *Attorney, Agent, or Firm* — Lyon & Harr, L.L.P.; Craig S. Fischer (57) ABSTRACT

An octree GPU construction system and method for constructing a complete octree data structure on a graphics processing unit (GPU). Embodiments of the octree GPU construction system and method first defines a complete octree data structure as forming a complete partition of the 3-D space and including a vertex, edge, face, and node arrays, and neighborhood information. Embodiments of the octree GPU construction system and method input a point cloud and construct a node array. Next, neighboring nodes are computed for each of the nodes in the node arrays by using at least two pre-computed look-up tables (such as a parent look-up table and a child look-up table). Embodiments of the octree GPU construction system and method then use the neighboring nodes and neighborhood information to compute a vertex array, edge array, and face array are computed by determining owner information and self-ownership information based on the neighboring nodes.

20 Claims, 10 Drawing Sheets

U.S. PATENT DOCUMENTS

2008/0030500 A1 2/2008 Krishnan et al.
2008/0317317 A1* 12/2008 Shekhar et al. ............... 382/131

OTHER PUBLICATIONS

Wilhelms, J., A. V. Gelder, Octrees for faster isosurface generation, ACM Trans. Graph., Jul. 1992, vol. 11, No. 3, pp. 201-227.
Noborio, H., S. Fukuda, S. Arimoto, Construction of the octree approximating a three-dimensional object by using multiple views, IEEE Trans. Pattern Anal. Mach. Intell., Nov./Dec. 1988, vol. 10, No. 6, pp. 769-782.
Ajmera, P., R. Goradia, S. Chandran, S. Aluru, Fast, parallel, GPU-based construction of space filling curves and octrees, Compute, Nov. 2008, pp. 1-1.
Minaud, B., Implementation of cost-measure-based octree construction algorithms, Thesis, Polytechnic University in Brooklyn, Sep. 2005, New York.
Lefebvre, S., S. Hornus, F. Neyret, Octree textures on the GPU, GPU Gems 2—Programming Techniques for High-Performance Graphics and General-Purpose Computation, Chapter 37, 2005, pp. 595-613.
Knoll, A., I. Wald, S. G. Parker, and C. D. Hansen, Interactive isosurface ray tracing of large octree volumes, Proc. of the 2006 IEEE Symposium on Interactive Ray Tracing, Sep. 2006, pp. 115-124.
Alexa, M., J. Behr, D. Cohen-Or, D. Fleishman, D. Levin, C. T. Silva, Point Set Surfaces, Proc. IEEE Visualization, Oct. 2001, pp. 21-28.
Alliez, P., D. Cohen-Steiner, Y. Tong, M. Desbrun, Voronoi-based variational reconstruction of unoriented point sets, Proc. of the Fifth Eurographics Symposium on Geometry Processing, Jul. 2007, pp. 39-48, Barcelona, Spain.
Amenta, N., Y. J. Kil, Defining point-set surfaces, ACM Trans. Graph., Aug. 2004, vol. 23, No. 3, pp. 264-270.
Amenta, N., M. W. Bern, M. Kamvysselis, a new voronoi-based surface reconstruction algorithm, Proc. of the 25th Annual Conf. on Comp. Graphics, Jul. 1998, pp. 415-421, Orlando, FL, USA.
Bajaj, C. L., F. Bernardini, G. Xu, Automatic reconstruction of surfaces and scalar fields from 3D scans, Proc. of the 22nd Annual Conf. on Comp. Graphics, Aug. 1995, pp. 109-118, Los Angeles, CA, USA.
Benson, D., J. Davis, Octree textures, ACM Trans. Graph., Jul. 2002, vol. 21, No. 3, pp. 785-790.
Boissonnat, J.-D., Geometric structures for three-dimensional shape representation, ACM Trans. Graph., Oct. 1984, vol. 3, No. 4, pp. 266-286.
Bolz, J., I. Farmer, E. Grinspun, P. Schröder, Sparse matrix solvers on the GPU: Conjugate gradients and multigrid, ACM Trans. Graph., Jul. 2003, vol. 22, No. 3, pp. 917-924.
Borghese, N. A., S. Ferrari, and V. Piuri, Real-time surface reconstruction through HRBF networks, Proc. IEEE Int. Workshop Haptic Virtual Environments Their Applications, (HAVE 2002), Nov. 2002, pp. 19-24.
Buchart, C., D. Borro, A. Amundarain, GPU local triangulation: an interpolating surface reconstruction algorithm, Comput. Graph. Forum, May 2008, vol. 27, No. 3, pp. 807-814.
Carr, J. C., R. K. Beatson, J. B. Cherrie, T. J. Mitchell, W. R. Fright, B. C. McCallum, T. R. Evans, Reconstruction and representation of 3D objects with radial basis functions, Proc. of the 28th Annual Conf. on Comp. Graphics, Aug. 2001, pp. 67-76, Los Angeles, California, USA.
Curless, B., M. Levoy, A volumetric method for building complex models from range images, Proc. of the 23rd Annual Conf. on Comp. Graphics, Aug. 1996, pp. 303-312, New Orleans, LA, USA.
DeCoro, C., N. Tatarchuk, Real-time mesh simplification using the GPU, Proc. of the 2007 Symposium on Interactive 3D Graphics, Apr. 30-May 2, 2007, pp. 161-166, Seattle, Washington, USA.
Gopi, M., S. Krishnan, C. T. Silva, Surface reconstruction based on lower dimensional localized delaunay triangulation, Comput. Graph. Forum, vol. 19, No. 3, Sep. 2000.
Hoppe, H., T. DeRose, T. Duchamp, J. A. McDonald, W. Stuetzle, Surface reconstruction from unorganized points, Proc. of the 19st Annual Conf. on Comp. Graphics and Interactive Techniques, Jul. 1992, pp. 71-78.
Hornung, A, Kobbelt, L., Robust reconstruction of watertight 3D models from non-uniformly sampled point clouds without normal information, Symposium on Geometry Processing, Proceedings of the Fourth Eurographics Symposium on Geometry Processing, Cagliari, Sardinia, Italy, Jun. 26-28, 2006, pp. 41-50.
Kazhdan, M., Bolitho, M., Hoppe, H., Poisson surface reconstruction, Symposium on Geometry Processing, Proceedings of the Fourth Eurographics Symposium on Geometry Processing, Cagliari, Sardinia, Italy, Jun. 26-28, 2006, pp. 61-70.
Kolluri, R., Shewchuk, J.R., O'Brien, J.F., Spectral surface reconstruction from noisy point clouds, Symposium on Geometry Processing, Proceedings of the Second Eurographics Symposium on Geometry Processing, Nice, France, Jul. 8-10, 2004, pp. 11-21.
Lefohn, A.E., Sengupta, S., Kniss, J., Strzodka, R., Owens, J.D., Glift: Generic, efficient, random-access GPU data structures, ACM Transactions on Graphics, vol. 25, No. 1, Jan. 2006, pp. 1-37.
Lipman, Y, Cohen-Or, D., Levin, D., Data-dependent MLS for faithful surface approximation, Symposium on Geometry Processing, Proceedings of the Fifth Eurographics Symposium on Geometry Processing, Barcelona, Spain, Jul. 4-6, 2007, pp. 59-67.
Lorensen, W.E., Cline, H.E., Marching cubes: A high-resolution 3D surface construction algorithm, Computer Graphics, vol. 21, No. 4, Jul. 1987, pp. 163-169.
Ohtake, Y., Belyaev, A., Alexa, M., Turk, G., Seidel, H.-P., Multi-level partition of unity implicits, ACM Transactions on Graphics, vol. 22, No. 3, Jul. 2003, pp. 463-470.
Pauly, M., Keiser, R., Kobbelt, L.P., Gross, M., Shape modeling with point-sampled geometry, Proceedings of SIGGRAPH, Jul. 27-31, 2003, pp. 641-650.
Popov, S., Gunther, J., Seidel, H.-P., Slusallek, P., Stackless kd-tree traversal for high-performace GPU ray tracing, Symposium on Geometry Processing, Proceedings of the Fifth Eurographics Symposium on Geometry Processing, Barcelona, Spain, Jul. 4-6, 2007, pp. 415-424.
Sharf, A., Lewiner, T., Shklarski, G., Toledo, S., Cohen-Or, D., Interactive topology-aware surface reconstruction, ACM Transactions on Graphics, vol. 26, No. 3, Jul. 2007.
Turk, G., O'Brien, J.F., Modeling with implicit surfaces that interpolate, ACM Transactions on Graphics, vol. 21, No. 3, Jan. 2002, pp. 855-873.
Westermann, R., Kobbelt, L., Ertl, T., Real-time exploration of regular volume data by adaptive reconstruction of isosurfaces, The Visual Computer, vol. 15, No. 2, 1999, pp. 100-111.
Wilhelms, J., Gelder, A.V., Octrees for faster isosurface generation, ACM Transactions on Graphics, vol. 11, No. 3, Jul. 1992, pp. 201-227.

* cited by examiner

*LUTparent*[4][9] = {
  {0, 1, 1, 3, 4, 4, 3, 4, 4},
  {1, 1, 2, 4, 4, 5, 4, 4, 5},
  {3, 4, 4, 3, 4, 4, 6, 7, 7},
  {4, 4, 5, 4, 4, 5, 7, 7, 8} };

*LUTchild*[4][9] = {
  {3, 2, 3, 1, 0, 1, 3, 2, 3},
  {2, 3, 2, 0, 1, 0, 2, 3, 2},
  {1, 0, 1, 3, 2, 3, 1, 0, 1},
  {0, 1, 0, 2, 3, 2, 0, 1, 0} };

OCTREE CONSTRUCTION ON GRAPHICS PROCESSING UNITS

BACKGROUND

An octree is a useful data structure that is used in many applications. These applications include spatial indexing, view frustrum culling, and surface reconstruction. In general, an octree is a three-dimensional (3-D) tree data structure. An octree is the 3-D analog of the quadtree data structure. More specifically, each internal node of the 3-D tree contains up to eight children.

An octree is a hierarchical data structure that is frequently used to completely partition a 3-D space. This partitioning is performed by recursively subdividing the 3-D space into eight equal pieces, or octants. Each node in the octree is recursively subdivided such that the space represented by each node is in one of the eight octants.

As mentioned above, an octree can be used in surface reconstruction. In surface reconstruction, the octree is used to perform surface reconstruction from point clouds. Traditionally, the octree is built from the point clouds using a central processing unit (CPU). Using a CPU to build an octree is the standard way an octree is built for use in surface reconstruction.

In theory, creating an octree from point clouds directly on a graphics processing unit (GPU) is highly desirable because of the parallel processing power of the GPU. In practice, however, creating the octree directly on a GPU is quite difficult. This difficulty is due in part to the problems of memory allocation and pointer creation. Some existing techniques use both a CPU and a GPU to create an octree. These techniques use an abstract and generic template library to define complex, random-access GPU data structures, such as octrees. One problem, however, with these techniques is that the octree is not constructed exclusively on the GPU. In particular, these techniques first construct the octree on central processing unit (CPU) and then send the octree to the GPU for use.

At least one existing technique builds a probability octree entirely on a GPU. This probability octree is a specialized type of octree that can only be used for specific, limited applications. The probability octree is built on the GPU to support adaptive clustering. The probability octree, however, is not a complete octree data structure. In particular, a complete octree data structure forms a complete partition of a 3-D space, and contains node, vertex, edge, and face arrays, and contains neighborhood information about neighboring nodes of the octree nodes.

On the other hand, the probability octree does not form a complete partitioning of a 3-D space (or volume) and only contains node information. Other elements such as faces, edges, and the neighborhood information are missing. The probability octree does not match a traditional, complete octree definition or have all the properties of the complete octree. In particular, a complete octree provides information about vertices, edges and faces of octree nodes, as well as the links to all neighbors of each octree node. This information, which is necessary for GPU surface reconstruction, is missing from a probability octree. Such probability octrees are not suitable for use in surface reconstruction.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the octree GPU construction system and method use techniques to construct a complete octree data structure from scratch on a graphics processing unit (GPU). The octree is a complete octree, meaning that it forms a complete partition of a three-dimensional (3-D) space. In addition, the complete octree includes node, vertex, edge, and face arrays of each of the octree nodes. The complete octree also includes information about neighboring vertices of each octree node. This information is necessary for several types of octree applications, such as GPU surface reconstruction. Incomplete octrees (such as probability octrees) do not form a complete partitioning of the 3-D space (or volume) and only contains node information. This makes the incomplete octrees unsuitable for many applications, such as fast surface reconstruction.

Embodiments of the octree GPU construction system and method first define a complete octree data structure. This describes what the octree data structure will contain. In particular, the complete octree data structure includes four arrays, the vertex, edge, face, and node arrays. And it also contains the neighborhood information. Each octree node will condense several pieces of this information into a "shuffled xyz key." This xyz key can be considered as an identification (or index) of each node.

Next, embodiments of the octree GPU construction system and method input a set of sample points in 3-D space. This set of sampled points is also known as a "point cloud." A node array then is constructed using the set of sampled points. The node array construction technique is optimized for use on a GPU such that several operations are performed in parallel. This means that most of the process can be thought of as big parallel primitives, such as the sort, reduce, compact primitives. Thus, the node array construction uses techniques that reformulate node array construction as a collection of those parallel primitives. Since those parallel primitives have been efficiently performed on a GPU, then the algorithm can also be done efficiently on the GPU. This efficient processing on the GPU also means that by using embodiments of the octree GPU construction system and method complete octree data structures can be constructed in real time.

Once the node array is constructed, embodiments of the octree GPU construction system and method then compute neighboring nodes for each of the nodes in the node arrays. In addition, neighborhood information is computed for each of these neighboring nodes. The neighborhood computation is performed efficiently using at least two pre-computed look-up tables. In some embodiments, the look-up tables include a parent look-up table and a child look-up table. The neighboring nodes are found by querying both the parent look-up table and the child look-up table. The neighborhood computation process is designed to be performed on a GPU. However, the neighborhood computation process can also be performed on a CPU in conjunction with traditional octree construction processes based on the CPU.

Embodiments of the octree GPU construction system and method then use the neighboring nodes and neighborhood information to compute additional arrays for the complete octree data structure. In particular, a vertex array, edge array, and face array are computed by determining owner information and self-ownership information based on the neighboring nodes. Once again, this process is optimized for parallel operations on the GPU. The resultant node, vertex, edge, and face arrays (as well as the neighborhood information) then are combined to construct the complete octree data structure.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout.

DETAILED DESCRIPTION

In the following description of embodiments of the octree GPU construction system and method reference is made to the accompanying drawings, which form a part thereof, and in which is shown by way of illustration a specific example whereby embodiments of the octree GPU construction system and method may be practiced. It is to be understood that other embodiments may be utilized and structural changes may be made without departing from the scope of the claimed subject matter.

I. Exemplary Operating Environment

Embodiments of the octree GPU construction system and method are designed to operate in a computing environment. The following discussion is intended to provide a brief, general description of a suitable computing environment in which embodiments of the octree GPU construction system and method may be implemented.

Figure 1:
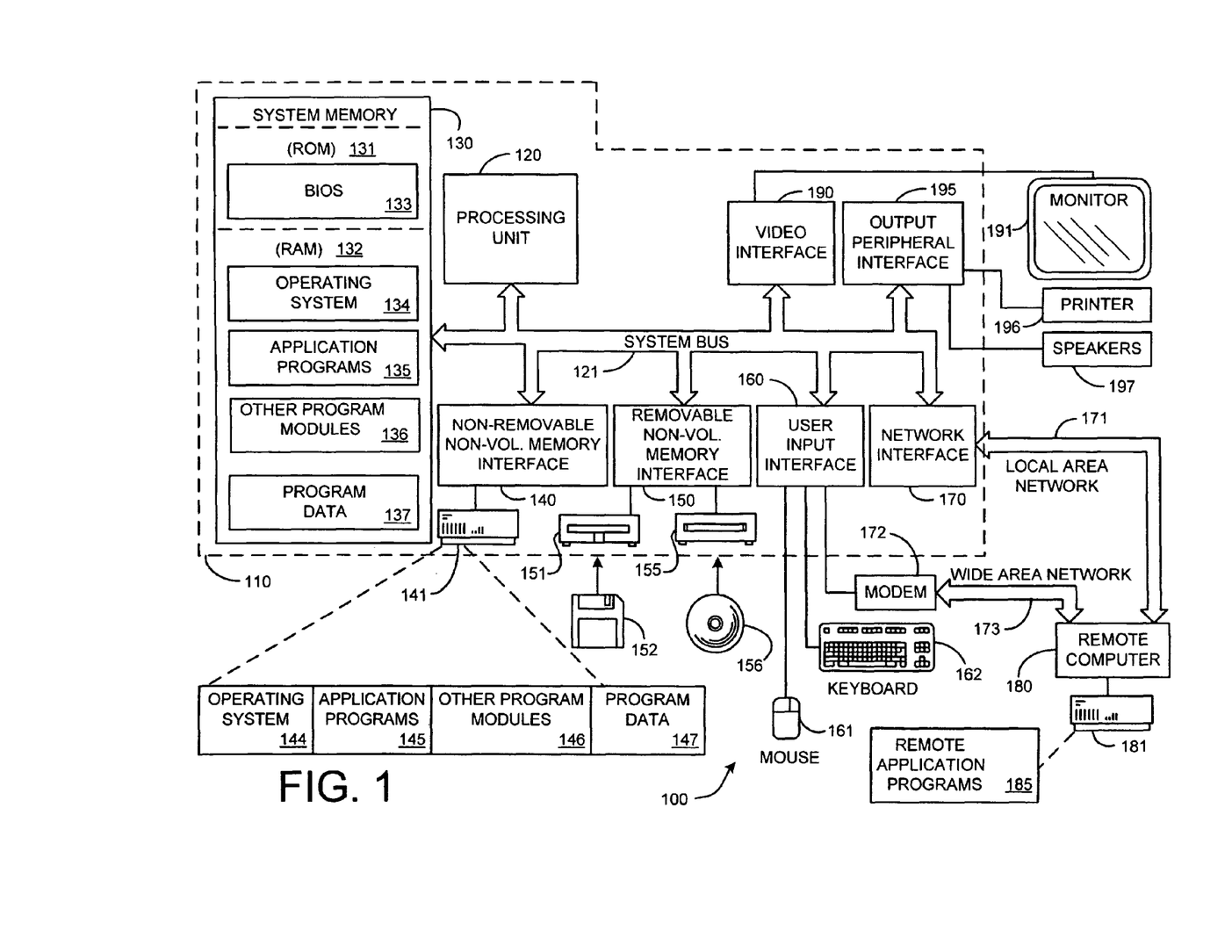
FIG. 1 illustrates an example of a suitable computing system environment in which embodiments of the octree GPU construction system and method shown in FIGS. 2-12 may be implemented.

FIG. 1 illustrates an example of a suitable computing system environment in which embodiments of the octree GPU construction system and method shown in FIGS. 2-12 may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment.

Embodiments of the octree GPU construction system and method are operational with numerous other general purpose or special purpose computing system environments or configurations. Examples of well known computing systems, environments, and/or configurations that may be suitable for use with embodiments of the octree GPU construction system and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Embodiments of the octree GPU construction system and method may be described in the general context of computer-executable instructions, such as program modules, being executed by a computer. Generally, program modules include routines, programs, objects, components, data structures, etc., that perform particular tasks or implement particular abstract data types. Embodiments of the octree GPU construction system and method may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for embodiments of the octree GPU construction system and method includes a general-purpose computing device in the form of a computer 110.

Components of the computer 110 may include, but are not limited to, a processing unit 120 (such as a central processing unit, CPU), a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within the computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information (or data) into the computer 110 through input devices such as a keyboard 162, pointing device 161, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 120 through a user input interface 160 that is coupled to the system bus 121, but may be connected by other interface and bus structures, such as, for example, a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

II. System Overview

Graphics processing units (GPUs) are designed to accelerate real-time 3D graphics display. As demand for improved graphics increases, GPUs are quickly becoming more powerful and programmable. As a result of their increased programmability, GPUs are also capable of efficiently processing many other type of non-graphics related processes. The octree GPU construction system and method disclosed herein alleviates the computational constraints of CPUs and takes advantage of the parallel processing capability of GPUs by constructing octree data structures entirely on the GPU. As explained in detail below, this requires the use of several techniques that are tailored to take advantage of parallel processing of the GPU optimize octree construction on the GPU.

Figure 2:
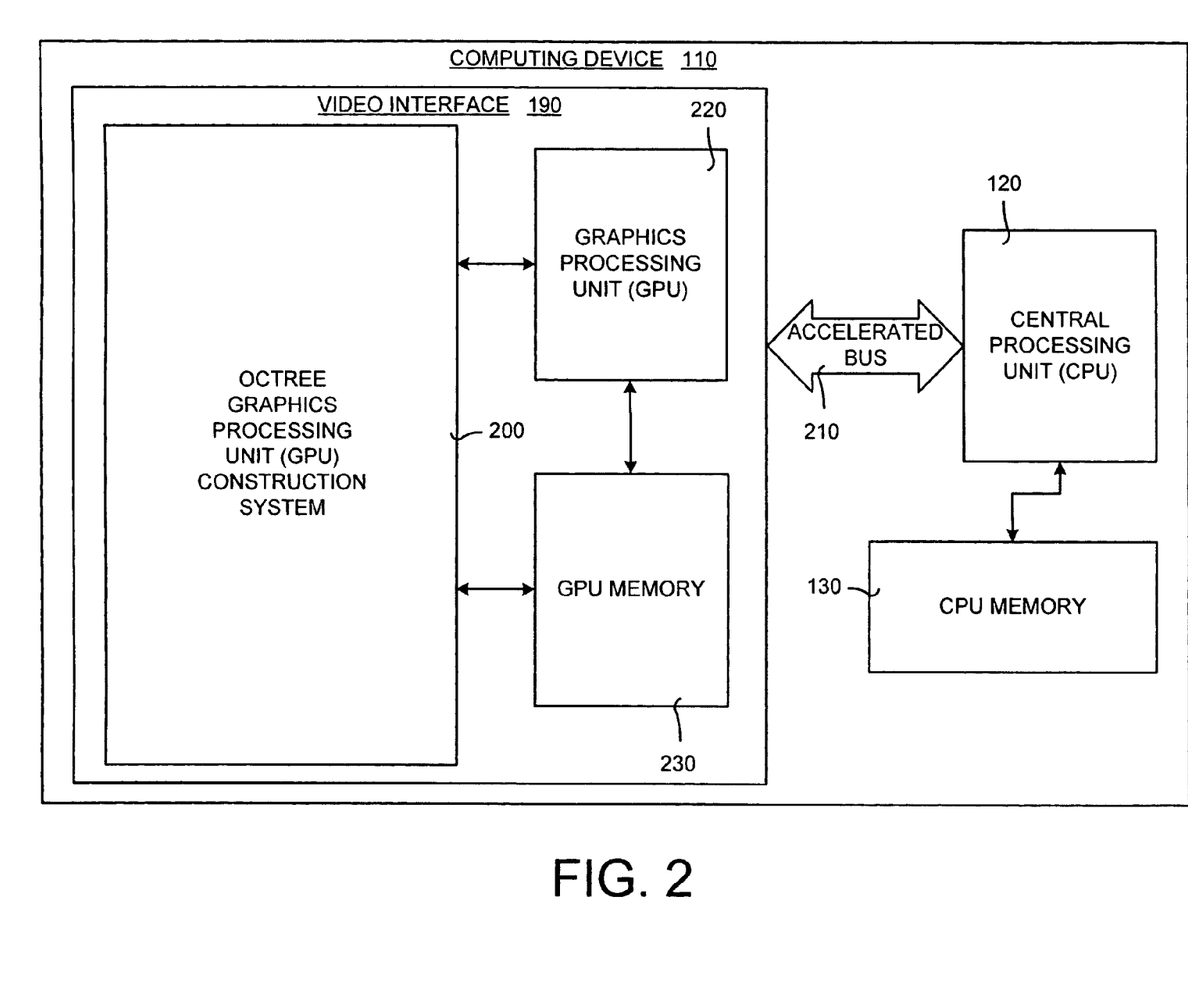
FIG. 2 is a block diagram illustrating an exemplary implementation of embodiments of the octree GPU construction system and method disclosed herein.

FIG. 2 is a block diagram illustrating an exemplary implementation of embodiments of the octree GPU construction system 200 and method disclosed herein. It should be noted that FIG. 2 is merely one of several ways in which embodiments of the octree GPU construction system 200 and method may implemented and used. More specifically, as shown in FIG. 2, the computing device (or computer) 110 contains an embodiment of an octree GPU construction system 200 and method. The computing device 110 further contains the CPU 120 and the CPU memory 130. The CPU is in communication with the video interface 190 through an accelerated bus 210. Preferably, this bus 210 is an Accelerated Graphics Port (AGP) or a PCI Express, which are designed especially for the throughput demand of three-dimensional 3-D graphics. The video interface 190 includes a graphics processing unit (GPU) 220 and a GPU memory 230. The GPU 220 is capable of transferring data to the CPU 120 over the bus 210. The octree GPU construction system 200 is also in communication with the GPU 220 and the GPU memory 230.

III. System Components

Figure 3:
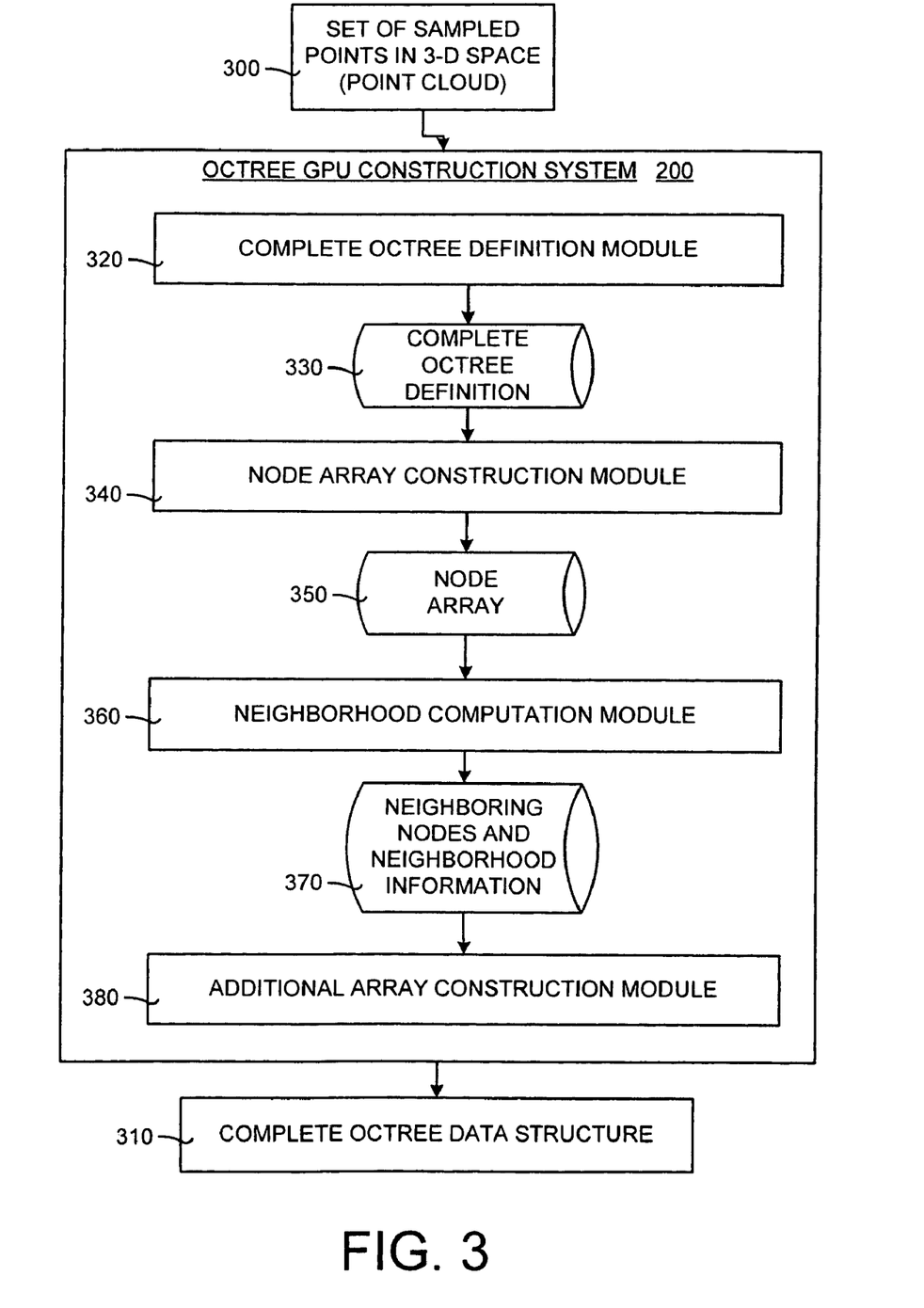
FIG. 3 is a block diagram illustrating details of embodiments of the octree GPU construction system and method shown in FIG. 2.

Embodiments of the octree GPU construction system 200 include a number of program modules. FIG. 3 is a block diagram illustrating details of embodiments of the octree GPU construction system 200 and method shown in FIG. 2. In general, FIG. 3 illustrates the program modules utilized by embodiments of the octree GPU construction system 200 to construct a complete octree data structure on the GPU 220.

Input to the embodiments of the octree GPU construction system 200 is a set of sampled points in three-dimensional (3-D) space 300. This is also known as a "point cloud". The point cloud is process by embodiments of the octree GPU construction system 200, and the output is a complete octree data structure 310. Embodiments of the octree GPU construction system 200 include a complete octree definition module 320. This module 320 defines a complete octree data structure as forming a complete partition of the 3-D space in which the point cloud is contained. Moreover, a complete octree contains node information, neighboring node information, neighborhood information around the neighboring nodes, vertex space information, and edge information. The combination of this information and the complete partition of the 3-D space form a complete octree data structure. The output of the complete octree definition module 320 is a complete octree definition 330.

Embodiments of the octree GPU construction system 200 also include a node array construction module 340. The node array construction module 340 uses a unique technique to build a node array for the complete octree data structure 310. The construction of the complete octree data structure 310 is optimized for use on the GPU 220. The output of the node array construction module 340 is a node array 350. Next, a neighborhood computation module 360 finds and computes neighboring octree nodes using the node array 350. In addition, the neighborhood computation module 360 finds neighborhood information about the neighboring nodes. The outputs of the neighborhood computation module 360 are neighboring nodes and the associated neighborhood information 370.

Embodiments of the octree GPU construction system 200 also include an additional array construction module 380 that constructs additional arrays using the neighboring nodes and neighborhood information 370. In particular, the module 380 constructs vertex arrays, edge arrays, and face arrays for the complete octree data structure 310. The computed information then is combined to generate the complete octree data structure 310, which is a complete partition of the 3-D space and conforms to the complete octree definition 330.

IV. Operational Overview

Figure 4:
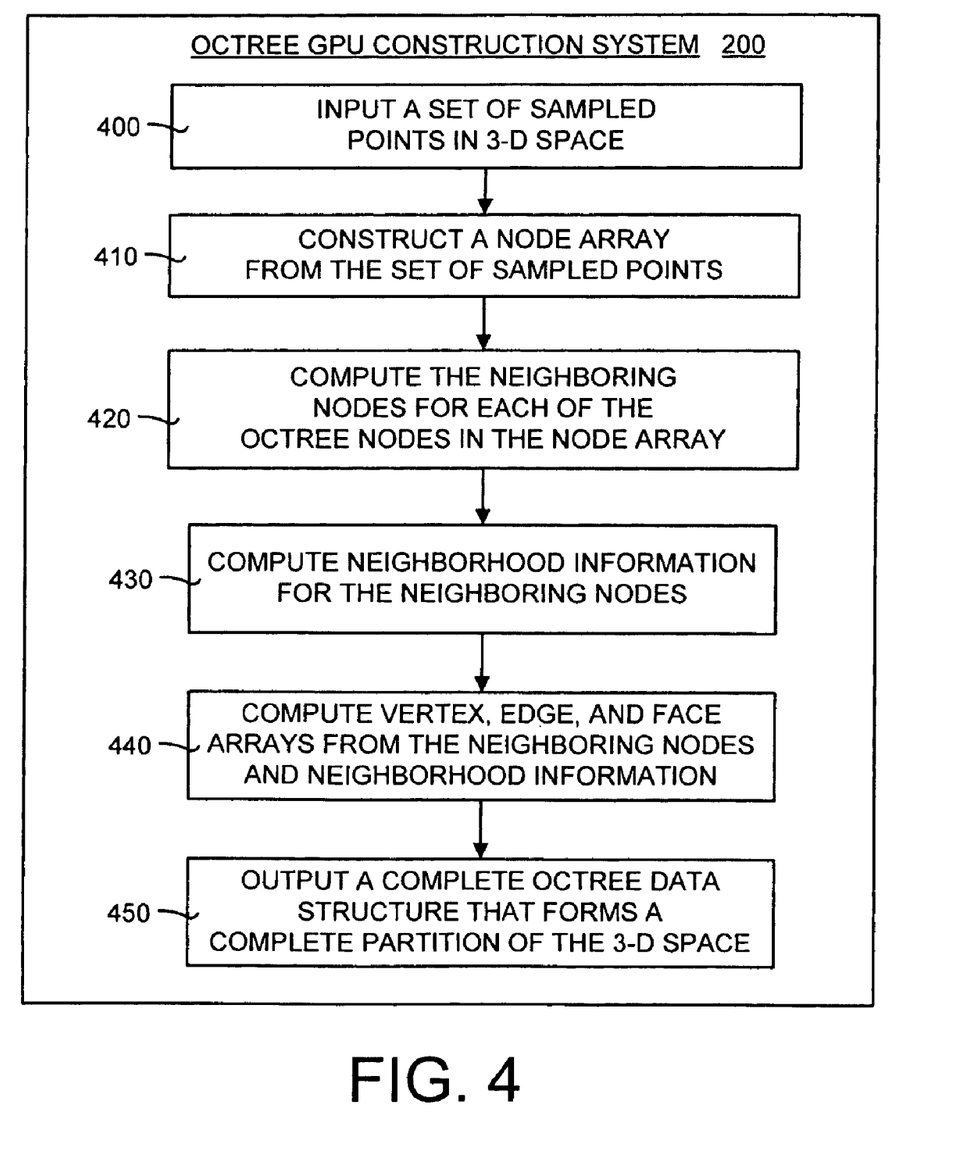
FIG. 4 is a flow diagram illustrating the operation of embodiments of the octree GPU construction system and method shown in FIGS. 2 and 3.

Embodiments of the octree GPU construction system 200 disclosed herein use the octree GPU construction method to enable construction of a complete octree data structure in real time on a GPU. FIG. 4 is a flow diagram illustrating the operation of embodiments of the octree GPU construction system 200 and method shown in FIGS. 2 and 3. The method begins by inputting a set of sampled point in a three-dimensional (3-D) space (box 400). As noted above, this set of sampled points may also be referred to as a "point cloud". Next, the method constructs a node array from the set of sampled points (box 410).

The method then computes neighboring nodes for each of the octree nodes in the node array (box 420). Moreover, the method computes neighborhood information for the neighboring nodes (box 430). The neighboring nodes and neighborhood information are used to compute vertex arrays, edge arrays, and face arrays (box 440). The output is a complete octree data structure that forms a complete partition of the 3-D space (box 450).

V. Operational Details

The operational details of embodiments of the octree GPU construction system 200 and method now will be discussed. These embodiments include embodiments of the program modules shown in FIG. 3. The operational details of each of these programs modules now will be explained in detail.

V.A. Definition of a Complete Octree

The discussion of the operational details of embodiments of the octree GPU construction system 200 and method begins with a discussion of how a complete octree is defined. In this section, it is described how to build a complete octree, O, having maximum depth, D, from a given set of sample points $Q=\{q_i|i=1,\ldots N\}$. First, the design of a complete octree data-structure is discussed. Next, a technique is presented for the parallel construction of a complete octree having only individual nodes. Then a look-up table (LUT)-based technique is introduced for efficiently computing the neighborhood information of every octree node in parallel. Finally, a technique for collecting information of vertices, edges, and faces of octree nodes is presented.

In general, the octree data structure consists of four arrays: a vertex array, an edge array, a face array, and a node array. The vertex, edge, and face arrays record the vertices, edges, and faces of the octree nodes, respectively. These arrays are relatively simple. In the vertex array, each vertex, v, records v.nodes, the pointers to all octree nodes that share vertex v. Following v.nodes, related elements can easily be reached, such as all edges sharing v. In the edge array, each edge records the pointers to its two vertices. Similarly, in the face array each face records the pointers to its four edges.

The node array, which records the octree nodes, is more complex. Each node, t, in the node array NodeArray contains three pieces of information:
1. The shuffled xyz key, t.key;
2. The sample points contained in t; and
3. Pointers to related data including its parent, children, neighbors, and other information as explained below.

Each of these pieces of information now will be discussed in more detail.

V.A.1. Shuffled xyz Key

Since each octree node has eight children, it is convenient to number a child node using a 3-bit code ranging from zero to seven. This 3-bit code encodes the sub-region covered by each child. Embodiments of the octree GPU construction system 200 and method use the xyz convention. Specifically, if the x bit is 1, the child covers an octant that is "right in x". Otherwise, the child covers an octant that is "left in x". The y and z bits are similarly set. The shuffled xyz key of a node at tree depth D is defined as the bit string:

$$x_1y_1z_1x_2y_2z_2\ldots x_Dy_Dz_D.$$

indicating the path from the root to this node in the octree. Therefore, a shuffled xyz key at depth D has 3·D bits. Currently, embodiments of the octree GPU construction system 200 and method use 32 bits to represent the key, and allow a maximum tree depth of 10. Any unused bits are set to zero.

V.A.2. Sample Points

Each octree node records the sample points enclosed by the node. The sample points are stored in a point array and sorted such that all points in the same node are contiguous. Thus, for each node t, embodiments of the octree GPU construction system 200 and method only need to store the number of points enclosed (which may be given by t.pnum), and the index of the first point in the point array (which may be given by t.pidx).

V.A.3. Connectivity Pointers

For each node, embodiments of the octree GPU construction system 200 and method record the pointers to the parent node, 8 child nodes, 27 neighboring nodes including itself, 8 vertices, 12 edges, and 6 faces. All pointers are represented as indices to the corresponding arrays. For example, t's parent node is NodeArray[t.parent] and t's first neighboring node is NodeArray[t.neighs[0]]. If the pointed element does not exist, then embodiments of the octree GPU construction system 200 and method set the corresponding pointer to −1. Since each node has 27 neighbors at the same depth, the array t.neighs is of size 27.

Figure 5:
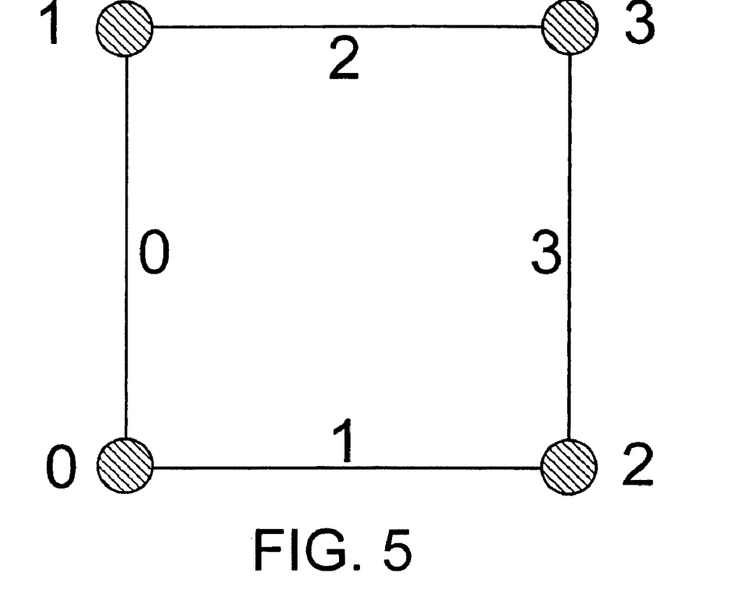
FIG. 5 illustrates an exemplary example of the ordering of vertices and edges of a node.
Figure 6:
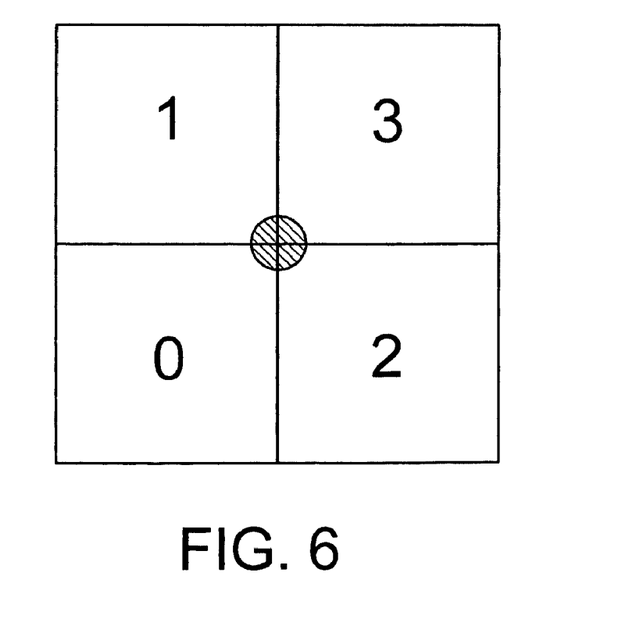
FIG. 6 illustrates an exemplary example of the ordering of a node's children as well as the ordering of nodes sharing a vertex.
Figure 7:
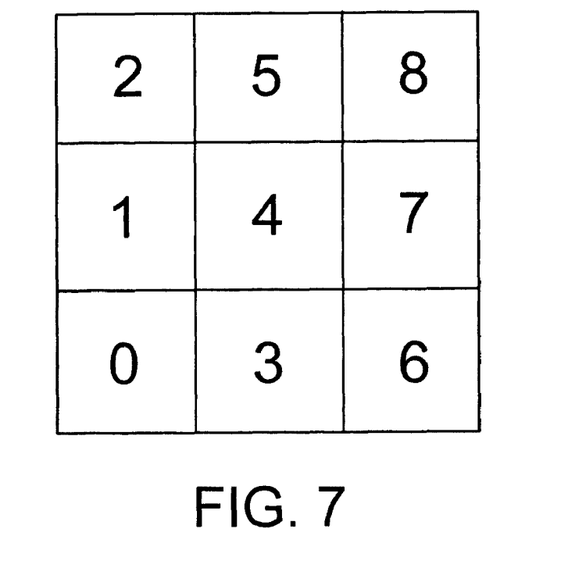
FIG. 7 illustrates an exemplary example of the ordering of a node's neighboring nodes.

For consistent ordering of the related elements, embodiments of the octree GPU construction system 200 and method order these elements according to their shuffled xyz keys. For example, t's first child node t.children[0] has the smallest key among t's eight children and the last child t.children[7] has the largest key. For a vertex, embodiments of the octree GPU construction system 200 and method define its key value as the sum of the keys of all nodes sharing the vertex. This way vertices can also be sorted. Similarly, edges and faces can be sorted as well. FIGS. 5-7 illustrate the ordering of the related elements for quadtrees, and the case with octrees is analogous. In particular, FIG. 5 illustrates an exemplary example of the ordering of vertices and edges of a node. As shown in FIG. 5, the points (or dots) are the vertices, while the sides are the edges. FIG. 6 illustrates an exemplary example of the ordering of a node's children as well as the ordering of nodes sharing a vertex. FIG. 7 illustrates an exemplary example of the ordering of a node's neighboring nodes.

V.B. Node Array Construction Module

The node array construction module 340 builds the node array by using a reverse level-order traversal of the octree. This reverse level-order traversal starts at the finest depth D and moves towards the root, one depth at a time. The node array construction at a certain depth D first will be discussed, and the node array construction at other depths will be discussed.

V.B.1. At Depth D

Figure 8:
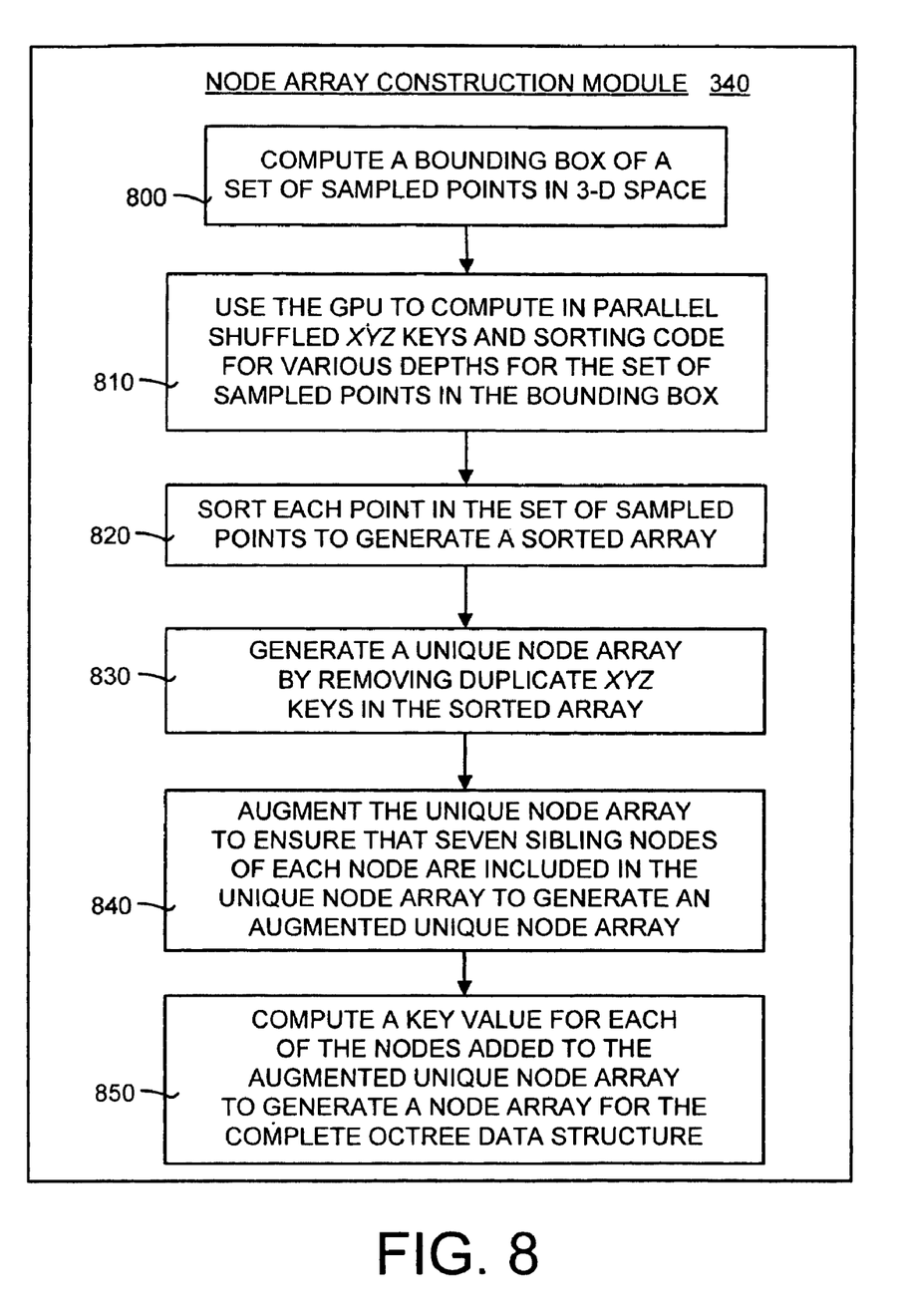
FIG. 8 is a detailed flow diagram illustrating the operation of embodiments of the node array construction module shown in FIG. 3.

FIG. 8 is a detailed flow diagram illustrating the operation of embodiments of the node array construction module 340 shown in FIG. 3. In particular, FIG. 8 is a detailed flow diagram illustrating the construction of a node array at a depth D. Referring to FIG. 8, the module 340 first computes a bounding box of a point set Q, which is a set of sampled points in 3-D space (box 800). This computation is performed by carrying out parallel reduction operations on coordinates of all sample points. These parallel reduction operations are known in the art. A Reduce primitive on the GPU performs a scan on an input array and outputs the result of a binary associative operator, such as min or max, applied to all elements of the input array.

Next, the module 340 uses the GPU to compute in parallel 32-bit shuffled xyz keys and sorting code at depth D for all sampled points within the bounding box (box 810). In particular, given a point p, its shuffled xyz key is computed in a top-down manner. The x bit at depth d, where $1 \leq d \leq D$, is computed as:

$$x_d = \begin{cases} 0, & \text{if } p \ldots x < C_d \ldots x. \\ 1, & \text{otherwise}, \end{cases}$$

where $C_d$ is the centroid of the node that contains i at depth d−1. The y and z bits, $y_d$ and $z_d$, are similarly computed. All unused bits are set to zero. The module 340 also concatenates the shuffled xyz key and the 32-bit point index to a 64-bit code for the subsequent sorting operation.

The module 340 then sorts each sampled point in the set of sampled point using a sort primitive to generate a sorted array (box 820). This sort primitive first performs a split-based radix sort per block and then a parallel merge sort of blocks, which are well known in the art. After sorting, points having the same key are contiguous in the sorted array. Then the index of each sample point in the original point array is computed by extracting the lower 32 bits of the point's code. The new point array is then constructed by copying the positions and normals from the original point array using the extracted indices.

The module 340 then generates a unique node array by removing duplicate xyz keys in the sorted array (box 830). This is performed as follows. First, for each element of the sorted array, the element is marked as invalid if its key value equals that of its preceding element in the array. Then, a compact primitive is used to generate the unique node array such that the array does not contain invalid elements. During this process, the relationship between the point array and the node array easily can be built. In particular, for each element of the node array, the module 340 records the number of points contained by this node and the index of the first point in the point array.

Next, the module 340 augments the unique node array to ensure that each node's seven sibling nodes are also included in the unique node array, since each octree node has either eight or zero children (box 840). This generates an augmented unique node array. Each element in the unique node array is checked to see if it shares the same parent with the preceding element. This is performed by comparing their keys. If the result is yes, then nodeNums[i] is set to zero. Otherwise nodeNums[i] is set to eight.

Then a parallel prefix sum/scan primitive is performed on the array nodeNums, and the result is stored in the array nodeAddress. Each element of nodeAddress thus holds the sum of all its preceding elements in nodeNums. In other words, nodeAddress contains the starting address of every unique node in the final node array.

Finally, the module 340 computes a key value for each of the nodes added to the augmented unique node array to generate a node array that is a complete octree data structure (box 850). In some embodiments the name of the node array is NodeArray$_D$. For each node that is added to the augmented unique node array, only the key value is computed and the number of points contained is set to zero. For each node in uniqueNode, the module 340 locates its corresponding element in NodeArray$_D$ through nodeAddress and its 3-bit $x_D y_D z_D$ key, and copy the node's data to this element. For each sample point in the point array, the module 340 also saves the pointer to the octree node that contains it.

V.B.2. At Other Depths

The node array at depth D−1 can easily be built from NodeArray$_D$. Recall that the eight siblings having the same parent are contiguous in NodeArray$_D$. For every eight sibling nodes in NodeArray$_D$, a parent node is generated by setting the last three bits of the keys of these nodes to zero. Again, the resulting parent nodes are augmented to generate the final array NodeArray$_{D-1}$. At this point, each node in NodeArray$_D$ can get the index of its parent node in NodeArray$_{D-1}$. For each node t in NodeArray$_{D-1}$, the pointers to its children are saved. The number of points t.pnum is computed as the sum of that of t's children, and the index of the first point t.pidx is set to be that of t's first child.

The node arrays at other depths can be built the same way. The node arrays of all depths then are concatenated to form a single node array. In some embodiments, the node array is denoted as NodeArray. Another array, BaseAddressArray, also is created, with each element of the array recording the first node at each depth in NodeArray.

V.C. Neighborhood Computation Module

The neighborhood computation module 360 finds neighboring nodes of each node in the node array. In particular, for each octree node in NodeArray, the module 360 finds the node's neighboring octree nodes at the same depth. This neighborhood information is useful for building the vertex, edge, and face arrays described below.

Each node has up to 26 neighbors at the same depth, distributed among its sibling nodes and the child nodes of its parent's neighbors. A naive approach for computing the neighbors is to enumerate all these candidate nodes, which requires 26×27×8=5616 searches for each node (26 neighbors, its parent and 26 neighbors of its parent, each neighbor having 8 children). The module 360 takes advantage of the observation that a node's neighbors are determined by the relative position of the node with respect to its parent and its parent's neighbors. Based on this observation, the module 360 pre-computes look-up tables to significantly speed up this neighborhood computation.

In some embodiments, the module 360 computes two look-up tables. Namely, a parent look-up table and a child look-up table are computed. These two look-up tables are defined as follows.

| Parent Table: | The parent look-up table LUTparent is a 2-D array providing the following information. For an octree node t whose parent is p, if t's index (or xyz key) in p.children is i, then the index of t.neighs[j]'s parent in p.neighs is LUTparent[i][j] |
|---|---|

| Child Table: | The child table LUTchild is a 2-D array with the following information. For the node t with parent p and index i in p.children as above, if node t's j-th neighbor t.neighs[j], whose parent node is h, the index of t.neigh[j] in h.children is LUTchild[i][j]. |
|---|---|

In some embodiments, the size of both tables is 8×27. For convenience a node is regarded as a neighbor of itself with index 13 in neighs. It should be noted that two kinds of pointers are distinguished. The direct pointers are those represented as indices into one of the "global" arrays. These global arrays can be the node, vertex, edge, and face arrays. For example, t.parent is a direct pointer. The indirect pointers are those represented as indices into one of the "local" arrays of a node. These local arrays include t.neighs, t.children, t.vertices, t.edges, and t.faces. The above two tables both record only indirect pointers, which are independent of specific instances of octrees and thus can be pre-computed.

Figure 9:
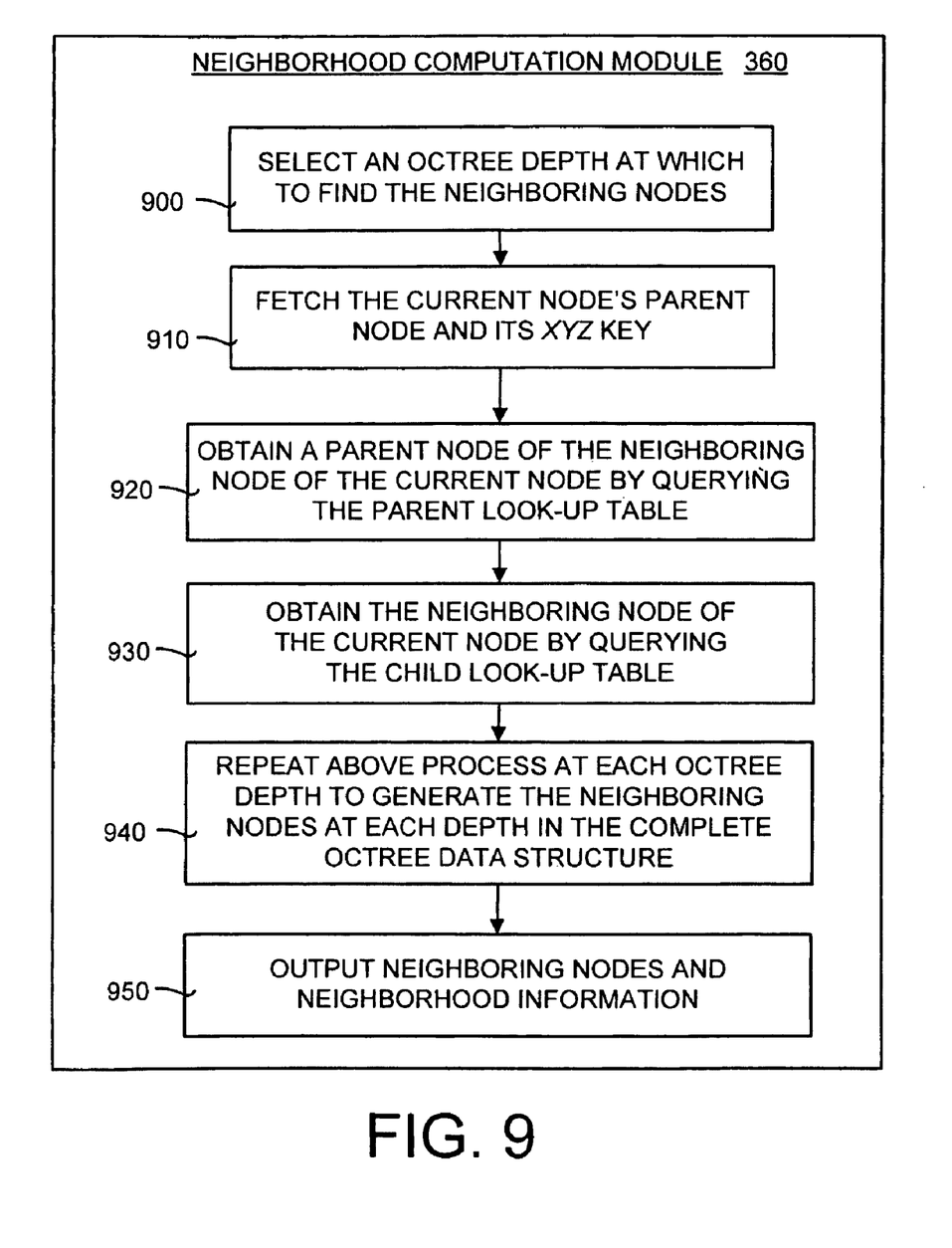
FIG. 9 is a detailed flow diagram illustrating the operation of embodiments of the neighborhood computation module shown in FIG. 3.

FIG. 9 is a detailed flow diagram illustrating the operation of embodiments of the neighborhood computation module 360 shown in FIG. 3. FIG. 9 illustrates the operation for computing the neighboring nodes for each node t at depth d in parallel. Referring to FIG. 9, first an octree depth is selected at which to find the neighboring nodes and neighborhood information (box 900). Next, the module 360 fetches a current node t's parent node p and its xyz key (box 910). This xyz key is t's index in p.children. To compute t's j-th neighbor t.neighs [j], the module 360 obtains this neighbor's parent node h by querying the parent look-up table, LUTparent (box 920). The module 360 then obtains the neighbor using a second query to the child look-up table, LUTchild (box 930). The module 360 then repeats the above process at each octree depth to generate the neighboring nodes at each depth in the complete octree data structure (box 940). Compared with the naive enumeration approach, this technique needs 27 searches and is over two orders of magnitude faster. The output of the module 360 are the neighboring nodes and the neighborhood information (box 950).

Figure 10:
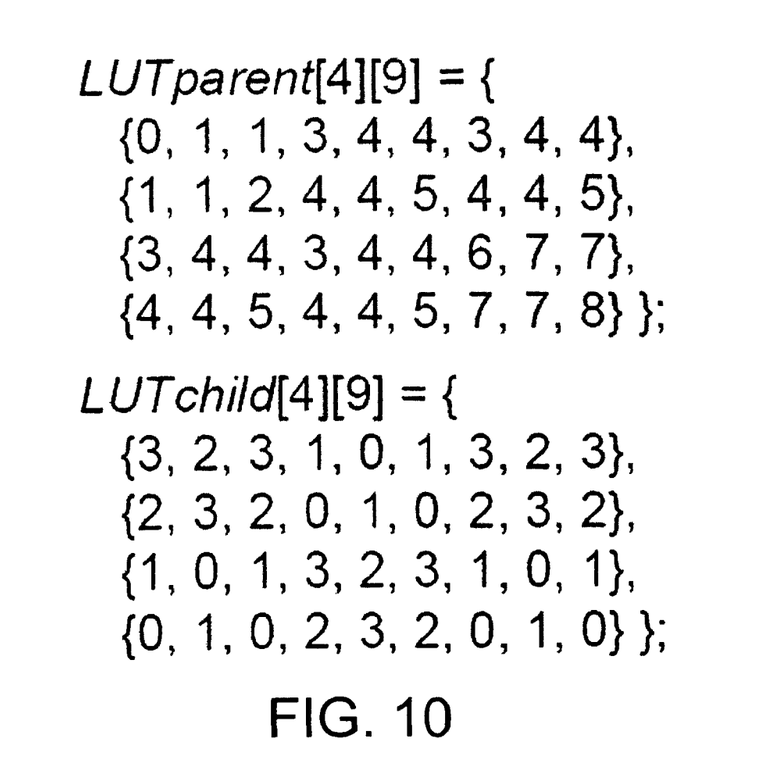
FIG. 10 is an exemplary example of a quadtree parent look-up table and a child look-up table.
Figure 11:
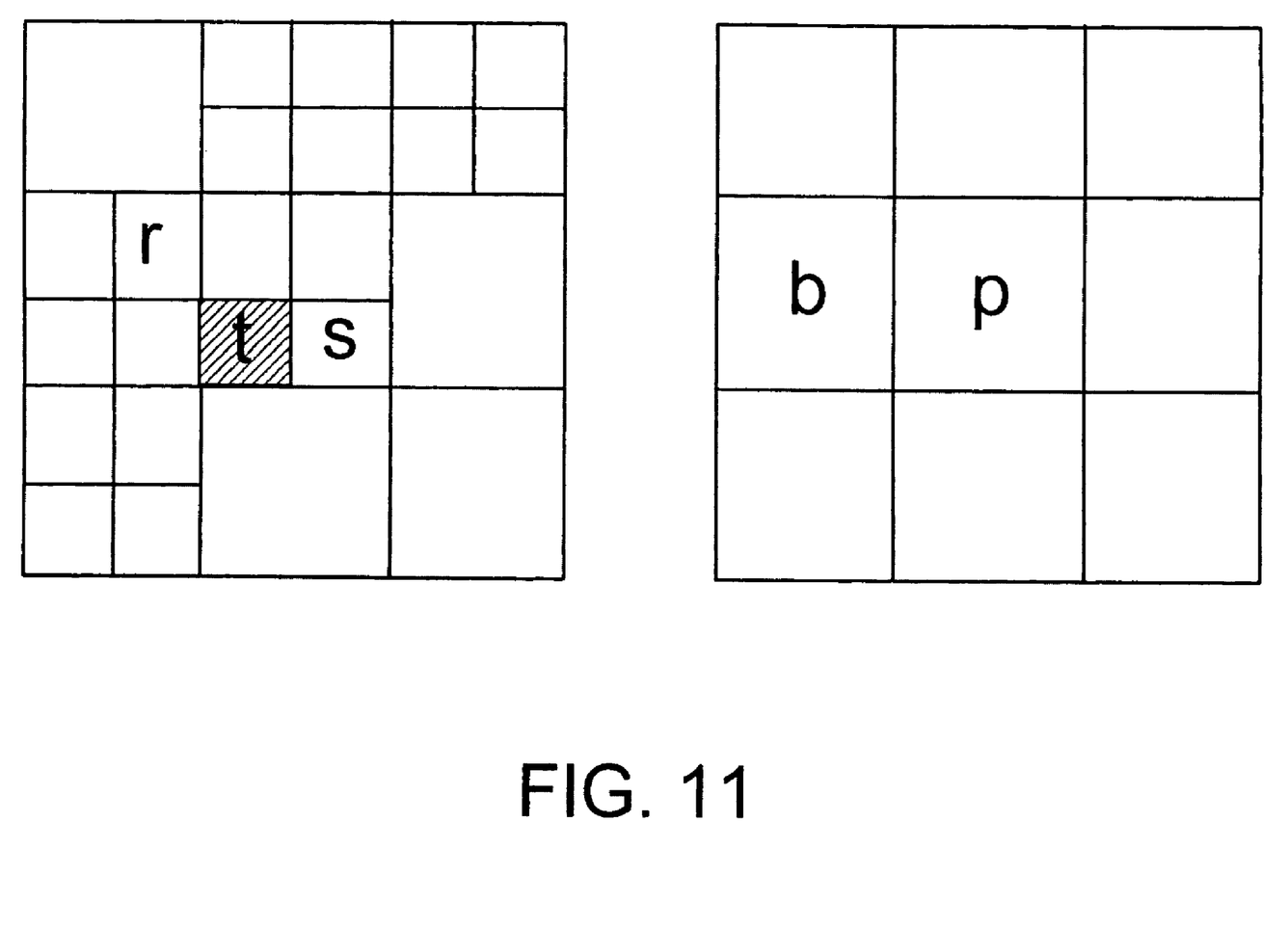
FIG. 11 is an exemplary example how the look-up tables shown in FIG. 10 are used to compute neighboring nodes.

For clarity, quadtrees are used to illustrate the process described above in FIG. 9. In particular, FIG. 10 is an exemplary example of a quadtree parent look-up table and a child look-up table. For ease of illustration, a quadtree is used instead of an octree. In FIG. 10, it can be send that the two tables for quadtrees, LUTparent and LUTchild, are of size 4×9. FIG. 11 is an exemplary example how the look-up tables shown in FIG. 10 are used to compute neighboring nodes. Once again, for ease of illustration a quadtree is used. As shown in FIG. 11, the quadtree node t's parent is p, and t's index in p.children is 0. In other words, i=0.

Referring again to FIG. 11, in order to compute t's 2-th neighbor (in other words, j=2), the module 260 first obtain p's 1-th neighbor, which is b, according to LUTparent[0][2]=1. Since LUTchild[0][2]=3, b's 3-th child, which is r, is the neighboring node that is desired. Therefore, t.neighs[2]= b.children[3]=r.

To compute t's 7-th neighbor (in other words, j=7), the module 360 first obtains p's 4-th neighbor, which is p itself, according to LUTparent[0][7]=4. Since LUTchild[0][7]=2, p's 2-th child, which is s, is the node that is desired. Therefore, t.neighs[7]=p.children[2]=s.

When computing a node's neighbors, its parent's neighbors are required. For this reason, the module 360 performs the above process for all octree depths using a forward level-order traversal of the octree. If node t's j-th neighbor does not exist, then t.neighs[j] is set as −1. For the root node, all its neighbors are −1 except its 13-th neighbor, which is the root itself.

V.D Additional Array Construction Module

The additional array construction module 380 constructs additional arrays using the neighboring nodes and neighborhood information. In particular, the vertex, edge, and face arrays are computed in the following manner.

V.D.1. Vertex Array

Each octree node has eight corner vertices. Simply adding the eight vertices of every node into the vertex array introduces many duplications because a corner may be shared by up to eight nodes. In some embodiments of the module 380, a duplication-free vertex array is created to sort all the candidate vertices by their keys and then remove duplicate keys (as was done for the node array above). This approach, however, can be inefficient due to the large number of nodes.

Figure 12:
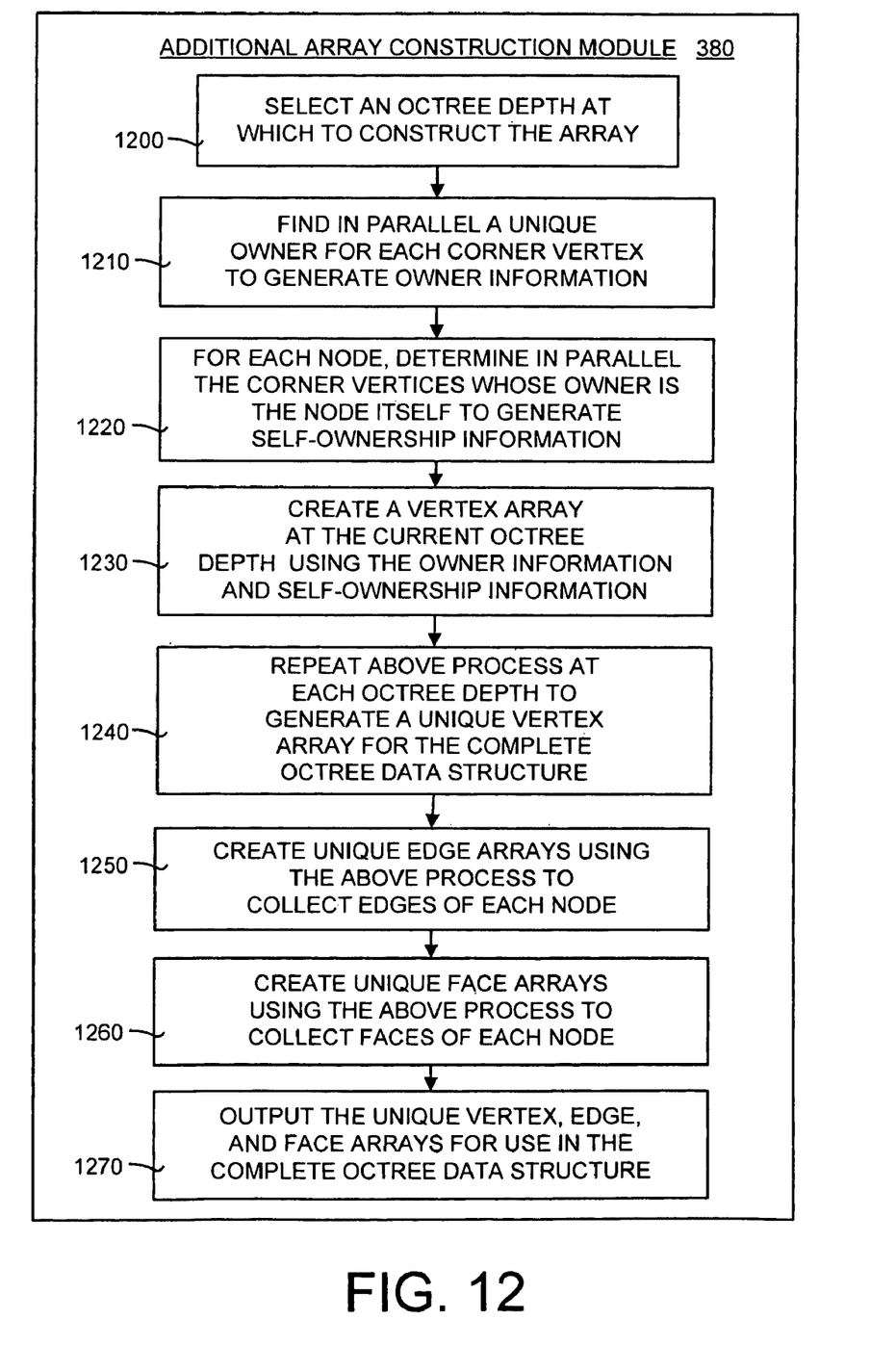
FIG. 12 is a detailed flow diagram illustrating the operation of embodiments of the additional array construction module shown in FIG. 3.

Other embodiments of the module 380 employ a more efficient way to create the vertex array by making use of node neighbors computed by the neighboring computation module 360. FIG. 12 is a detailed flow diagram illustrating the operation of embodiments of the additional array construction module 380 shown in FIG. 3. As shown in FIG. 12, building a vertex array at octree depth d includes the following steps. First, an octree depth is selected for which to construct the vertex array (box 1200). Next, for the selected octree depth, the module 380 finds in parallel a unique owner node for every corner vertex (box 1210). This generates owner information. The owner node of a corner is defined as the node that has the smallest shuffled xyz key among all nodes sharing the corner. Observing that all nodes that share corners with node t are t's neighbors, the module 380 can quickly locate the owner of each corner from t's neighbors. Next, for each node the module 380 in parallel determines the corner vertices whose owner is the node itself to generate self-ownership information (box 1220). In other words, for each node t in parallel, all corner vertices whose owner is t itself are collected.

The module 380 then creates a vertex array at the current octree depth using the owner information and the self-ownership information (box 1230). During this process, the vertex pointers t.vertices are saved. For each vertex v in the vertex array, the node pointers v.nodes are also appropriately set.

To build the vertex array of all octree nodes, the above process is performed at each depth independently. The resulting vertex arrays then are concatenated to form a single vertex array. In other words, above process is repeated at each octree depth to generate a unique vertex array for the complete octree data structure (box 1240). Unlike the node array, the vertex array obtained still has duplicate vertices between different depths. However, since this typically does not affect subsequent surface reconstruction, these duplicate vertices may be left alone.

V.D.2. Other Arrays

The edge and face arrays can be built in a manner similar to the vertex array. For each edge and face of each node, the module 380 first finds its owner node. Once the owner node is found, then the unique edge and face arrays are created by collecting edges and faces from the owner nodes. In this manner, the edge arrays and the face arrays are generated.

In particular, referring to FIG. 12, the module 380 creates a unique edge array using the above process to collect the edges of each of the nodes (box 1250). Moreover, a unique face array is created by the module 380 using the above process to collect the faces of each of the nodes (box 1260). The output of the module 380 are the unique vertex, edge, and face arrays that are used in the complete octree data structure (box 1270).

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A computer-implemented method for constructing a complete octree data structure on a graphics processing unit (GPU), comprising:
   inputting a set of sampled points in three-dimensional (3-D) space;
   building a node array from the set of sampled points using a bounding box and shuffled xyz keys by using a reverse level-order traversal of the octree data structure that starts at a finest depth of the octree data structure and moves towards a root of the octree data structure, one depth at a time; and
   computing vertex, edge, and face arrays from the node array to generate the complete octree data structure that forms a complete partition of the 3-D space.

2. The computer-implemented method of claim 1, further comprising:
   computing neighboring nodes of each node in the node array; and
   computing the vertex, edge, and face arrays from the neighboring nodes of the node array.

3. The computer-implemented method of claim 2, further comprising computing a bounding box of the set of sampled points.

4. The computer-implemented method of claim 3, further comprising using the GPU to compute in parallel shuffled xyz keys and sort code at a depth D for the set of sampled points within the bounding box.

5. The computer-implemented method of claim 4, further comprising:
   sorting each point in the set of sampled points to generate a sorted array; and
   generating a unique node array by removing duplicate xyz keys in the sorted array.

6. The computer-implemented method of claim 5, further comprising augmenting the unique node array to ensure that seven sibling nodes of each node in the octree data structure are included in the unique node array, to generate an augmented unique node array.

7. The computer-implemented method of claim 6, further comprising computing a key value for each of the nodes added to the augmented unique node array to generate a node array for the complete octree data structure.

8. The computer-implemented method of claim 2, further comprising pre-computing two look-up tables to accelerate computing neighboring nodes of each node in the node array.

9. The computer-implemented method of claim 8, further comprising:
   defining a parent look-up table as a two-dimensional (2-D) array; and
   defining a child look-up table as a 2-D array.

10. A computer-implemented method for building a complete octree data structure entirely on a graphics processing unit (GPU), comprising:
    inputting point cloud containing a set of sampled points in a three-dimensional (3-D) space;
      building a node array from the point cloud using a bounding box and shuffled xyz keys by using a reverse level-order traversal of the octree data structure that starts at a finest depth of the octree data structure and moves towards a root of the octree data structure, one depth at a time;
    computing neighboring nodes for each of the nodes in the node array; and
    building a vertex array, an edge array, and a face array using the neighboring nodes to generate the complete octree data structure.

11. The computer-implemented method of claim 10, further comprising defining a complete octree data structure as an octree that forms a complete partition of the 3-D space and contains node information, neighboring node information, vertex information, and edge information.

12. The computer-implemented method of claim 11, further comprising using two pre-computed look-up tables to compute the neighboring nodes for each of the nodes in the node array.

13. The computer-implemented method of claim 12, further comprising:
    pre-computing a parent look-up table, which is a two-dimensional (2-D) array;
    pre-computing a child look-up table, which is a 2-D array; and
    querying the neighboring nodes using the parent look-up table and the child look-up table to obtain neighborhood information.

14. The computer-implemented method of claim 13, wherein building the vertex array further comprises:
   finding in parallel a unique owner node for each corner vertex of the complete octree data structure; and
   collecting corner vertices whose owner is one of the nodes of the node array to generate a unique vertex array.

15. The computer-implemented method of claim 14, further comprising building the vertex array of each node in the node array at each depth independently of each other.

16. A method for constructing a complete octree data structure using a processor, comprising:
   inputting point cloud containing a set of sampled points in a three-dimensional (3-D) space;
   building a node array from the point cloud using a bounding box and shuffled xyz keys by using a reverse level-order traversal of the octree data structure that starts at a finest depth of the octree data structure and moves towards a root of the octree data structure, one depth at a time;
   computing neighboring nodes for each node in the node array and neighborhood information associated with each of the neighboring nodes using pre-computed look-up tables; and
   computing a vertex array, an edge array, and a face array for each node in the node array using the neighborhood information to generate the complete octree data structure.

17. The method of claim 16, further comprising:
   defining a pre-computed parent look-up table and a child look-up table for each node in the node array;
   fetching the parent look-up table for a node and its associated xyz key; and
   querying the parent look-up table to find a parent node of a neighboring node of the node.

18. The method of claim 17, further comprising querying the child look-up table for the parent node to find the neighboring node of the node.

19. The method of claim 16, further comprising computing the neighboring nodes in parallel using a graphics processing unit (GPU).

20. The method of claim 16, further comprising computing the neighboring nodes in serial using a central processing unit (CPU).

* * * * *